United States Patent
Itoh

(10) Patent No.: US 8,817,973 B2
(45) Date of Patent: Aug. 26, 2014

(54) ENCRYPTING METHOD HAVING COUNTERMEASURE FUNCTION AGAINST POWER ANALYZING ATTACKS

(75) Inventor: Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 12/890,212

(22) Filed: Sep. 24, 2010

(65) Prior Publication Data

US 2011/0013770 A1 Jan. 20, 2011

Related U.S. Application Data

(63) Continuation of application No. PCT/JP2008/000833, filed on Mar. 31, 2008.

(51) Int. Cl.
*H04L 9/00* (2006.01)
*H04L 9/30* (2006.01)
*G06F 7/72* (2006.01)

(52) U.S. Cl.
CPC .......... *G06F 7/723* (2013.01); *H04L 9/302* (2013.01); *G06F 2207/7219* (2013.01); *H04L 9/003* (2013.01)
USPC .................. 380/28; 380/44; 380/286

(58) Field of Classification Search
CPC ......... H04L 9/003; H04L 9/002; H04L 9/302; G06F 7/725; G06F 7/728; G06F 2207/7261; G06F 7/723; G06F 2207/7223; G06F 2207/7242
USPC ..................... 380/28, 30
See application file for complete search history.

(56) References Cited

U.S. PATENT DOCUMENTS

| 7,000,111 | B1 | 2/2006 | Dent et al. | |
|---|---|---|---|---|
| 2002/0166057 | A1 | 11/2002 | Kaminaga et al. | |
| 2004/0148325 | A1 | 7/2004 | Endo et al. | |
| 2005/0078821 | A1* | 4/2005 | Jin et al. | 380/46 |
| 2005/0152541 | A1 | 7/2005 | Takenaka et al. | |
| 2007/0121935 | A1* | 5/2007 | Joye | 380/30 |

FOREIGN PATENT DOCUMENTS

| JP | 2002-261753 | | 9/2002 |
|---|---|---|---|
| JP | 2003-233307 | * | 8/2003 |
| JP | 2004-519132 | | 6/2004 |
| JP | 2004-226674 | | 8/2004 |
| WO | 2004/055756 | | 7/2004 |

OTHER PUBLICATIONS

A. Menezes, et al.; "Handbook of Applied Crytography"; CRC Press, Inc.; 1997; pp. 591-634.

(Continued)

*Primary Examiner* — Shewaye Gelagay
(74) *Attorney, Agent, or Firm* — Staas & Halsey LLP

(57) ABSTRACT

Based on an encrypting method for performing an exponential remainder calculation $y=a^d \pmod n$ from an u-bit exponent $d=(d_{u-1}, \ldots, d_0)_2$, input data a, and a modulo n, calculating $a'=a^2 \pmod n$ is performed first. Next, calculating $y=(a')^f \pmod n$ is performed on $f=(d_{u-1}, d_{u-2}, \ldots, d_1)_2$. Then, when $d_0=1$, calculating $y=y \times a \pmod n$ is performed. Then, outputting $y=a^d \pmod n$ is performed. In the first step, although an attacker inputs data including a minus value such as $a=-1$ and $a=s$, $-s$, etc., only plus values can be constantly generated in multiplication and squaring. Therefore, the method makes it hard to estimate a secret key using power analyzing attacks such as the SPA and the DPA, thereby realizing an encryption processor having high tamper-resistance.

7 Claims, 22 Drawing Sheets

(56) References Cited

OTHER PUBLICATIONS

J. Coron; "Resistance against Differential Power Analysis for Elliptic Curve Cryptosystems"; Cryptographic Hardware and Embedded Systems (CHES '99), 1999, Lecture Notes in Computer Science vol. 1717, pp. 292-302.

P. Kocher et al; "Differential Power Analysis"; CRYPTO '99, 1999, Lecture Notes in Computer Science vol. 1666, pp. 388-397.

T. Messerges, et al.; Power Analysis Attacks of Modular Exponentiation in Smartcards; CHES '99, 1999, Lecture Notes in Computer Science vol. 1717, pp. 144-157.

International Search Report for Application No. PCT/JP2008/000833; mailed Jun. 17, 2008.

Japanese Office Action mailed Apr. 9, 2013 for corresponding Japanese Application No. 2010-505041.

Partial English Translation (paragraphs [0003] and [0004]) of JP 2003-233307.

Japanese Office Action issued Oct. 23, 2012 in corresponding Japanese Patent Application No. 2010-505041.

Kouichi Itoh et al., "DPA Countermeasures by Improving the Window Method", Cryptographic Hardware and Embedded Systems, Aug. 2002, vol. 2523, pp. 303-317.

European Search Report for 08720699.1 dated Mar. 3, 2014.

S.M. Yen et al.; "Power Analysis by Exploiting Chosen Message and Internal Collisions—Vulnerability of Checking Mechanism for RSA-Decryption"; E. Dawson and S. Vaudenay (Eds.): Mycrypt 2005, LNCS 3715, pp. 183-195.

C. Giraud; "An RSA Implementation Resistant to Fault Attacks and to Simple Power Analysis"; IEEE Transactions on Computers, vol. 55, No. 9, Sep. 2006, pp. 1116-1120.

* cited by examiner

```
-input
    d : SECRET KEY, EXPRESSED BY u-bit, d=(d_{u-1},...,d_1,d_0)_2 WHERE d_i IS i-TH BIT VALUE OF d.
    a : CIPHER TEXT
    n : METHOD
-output
    v=a^d (mod n)

v=1;
for(i=u-1;i>=0;i=i-1) {
    /*PERFORMING SQUARING*/
    v=v×v (mod n);

/*PERFORMING MULTIPLICATION*/
    if (d_i ==1) v = v×a (mod n);
}
return v;
```

Related Art

F I G. 1

```
-input
d : SECRET KEY, u-bit, EXPRESSED BY d=(d_{u-1}, ..., d_1, d_0)_2 WHERE d_i IS i-TH BIT VALUE OF d.
a : CIPHER TEXT
n : METHOD
-output
v=a^d (mod n)

/* make k-bit window w[x] = a^x (mod n) for 0<x<2^k */
w[0]=1; w[1]=a;
v=1;
for (i=Ceiling(u/k)-1; i>0; i=i-1)
  /*PERFORMING SQUARING*/
  v=v×v (mod n);

/*PERFORMING MULTIPLICATION*/
  /*PERFORMING SQUARING k TIMES CONTINUOUSLY*/
  for (j=0; j<k; j++) v=v×v (mod n);

/*EXTRACTING BIT VALUE OF d IN k-BIT UNITS AND PROVIDING THE VALUE FOR bi. */
  b_i= (d_ik+k-1, ..., d_ik+1, d_ik)_2

/*PERFORMING MULTIPLICATION*/
  v = v×w[b_i] (mod n);
}
return v;
```

Related Art

F I G. 2

(PROCEDURE-1) CALCULATING $a' = a^2 \pmod{n}$ (PROCEDURE-2) CALCULATING $y = (a')^f \pmod{n}$ USING BINARY METHOD OR WINDOW METHOD FOR $f = (d_{u-1}, d_{u-2}, \ldots, d_1)_2$ (PROCEDURE-3) CALCULATING $y = y \times a \pmod{n}$ IF $g=1$ FOR $g=d_0$ (PROCEDURE-4) OUTPUTTING $y = a^d \pmod{n}$, AND TERMINATING PROCESS

F I G. 9

- input
  d: SECRET KEY, u-bit, EXPRESSED BY $d=(d_{u-1}, \cdots, d_1, d_0)_2$ WHERE $d_i$ IS i-TH BIT VALUE OF d.
  a: CIPHER TEXT
  n: METHOD
- output
  $v=a^d \pmod{n}$ 1401  v=1;
1402  a' = a² (mod n)
1403  for(i=u-1; i>=1; i=i-1) {
1404      /* PERFORMING SQUARING */
1405      v=v×v (mod n);
1406      /* PERFORMING MULTIPLICATION */
1407      if (d_i ==1) v = v×a' (mod n);
1408  }
1409  if (d_0==1) v = v×a (mod n);
1409  return v;

FIG. 14

```
-input
  d: SECRET KEY, u-bit, EXPRESSED BY d=(d_{u-1}, ..., d_1, d_0)_2 WHERE d_i IS i-TH BIT VALUE OF d.
  a: CIPHER TEXT
  n: METHOD
-output
  v=a^d (mod n)

1501  v=a^2 (mod n);
1502  a' = v
1503  for (i=u-2; i>=1; i=i-1) {
1504    /* PERFORMING SQUARING */
1505    v=v×v (mod n);
1506    /* PERFORMING MULTIPLICATION */
1507    if (d_i ==1) v = v×a' (mod n);
1508  }
1509  if (d_0==1) v = v×a (mod n);
1509  return v;
```

FIG. 15

```
-input
 d: SECRET KEY, u-bit, EXPRESSED BY d=(d_{u-1}, ..., d_1, d_0)_2 WHERE d_i IS i-TH BIT VALUE OF d.
 a: CIPHER TEXT
 n: METHOD
-output
 v=a^d (mod n)

/* make k-bit window w[x] = a^{2x} (mod n) for 0<x<2^k */
1601 w[0]=1; w[1]=a^2 (mod n);
1602 for (i=2;i<2^k;i++) w[i] = w[1]×w[i-1] (mod n);
1603 v=1;
1604 for (i=Ceiling((u-1)/k)-1; i>=0; i=i-1) {
1605   /* PERFORMING SQUARING k TIMES CONTINUOUSLY */
1606   for (j=0; j<k; j++) v=v×v (mod n);
1607   /* EXTRACTING BIT VALUE OF d IN k-bit UNITS, AND PROVIDING THE VALUE FOR b_i */
1608   b_i= (d_{ik+k}, ..., d_{ik+1})_2
1609   /* PERFORMING MULTIPLICATION */
1610   v = v×w[b_i] (mod n);
1611 }
1612 if (d_0==1) v = v × a (mod n)
1613 return v;
```

```
-input
 d: SECRET KEY, u-bit, EXPRESSED BY d=(d_{u-1}, ..., d_1, d_0)_2 WHERE d_i IS i-TH BIT VALUE OF d.
 a: CIPHER TEXT
 n: METHOD
-output
 v=a^d (mod n)

/* make k-bit window w[x] = a^{2x} (mod n) for 0<x<2^k */
1701 w[0]=1; w[1]=a^2 (mod n);
1702 for (i=2; i<2^k; i++) w[i] = w[1]×w[i-1] (mod n);
1703 i=Ceiling((u-1)/k)-1;
1704 b_i = (d_{ik+k}, ..., d_{ik+1})_2
1705 v=w[b_i];
1706 for (i=Ceiling((u-1)/k)-1; i>=0; i=i-1) {
1707  /* PERFORMING SQUARING k TIMES CONTINUOUSLY */
1708  for (j=0; j<k; j++) v=v×v (mod n);
1709  /* EXTRACTING BIT VALUE OF d IN k-bit UNITS, AND PROVIDING THE VALUE FOR b_i */
1710  b_i = (d_{ik+k}, ..., d_{ik+1})_2
1711  /* PERFORMING MULTIPLICATION */
1712  v = v×w[b_i] (mod n);
1713 }
1714 if (d_0==1) v = v × a (mod n)
1715 return v;
```

```
-input
d: SECRET KEY, u-bit, EXPRESSED BY d=($d_{u-1}$, ..., $d_1$, $d_0$)$_2$ WHERE $d_i$ IS i-TH BIT VALUE OF d.
A: POINT ON OVAL CURVE -output
V=dA (POINT V OBTAINED BY MULTIPLYING POINT A BY d)

1801  V=0;    /* V=0 REFERS TO POINT ON OVAL CURVE CORRESPONDING TO v=1, AND A=A+0=0+A  */
1802  A' = 2A
1803  for(i=u-1;  i>=1;  i=i-1) {
1804        /* PERFORMING DOUBLING PROCESS OF POINT */
1805        V=2A;
1806        /* PERFORMING ADDITION OF POINT */
1807        if ($d_i$ ==1) V = V+A'
1808  }
1809  if ($d_0$==1) V=V+A;
1809  return V;
```

F I G. 1 8

```
-input
d: SECRET KEY, u-bit, EXPRESSED BY d=(d_{u-1}, ..., d_1, d_0)_2 WHERE d_i IS i-TH BIT VALUE OF d.
A: POINT ON OVAL CURVE
-output
V=dA (POINT V OBTAINED BY MULTIPLYING POINT A BY d)

1901 V=2A (mod n);
1902 A' = V
1903 for(i=u-2; i>=1; i=i-1) {
1904      /* PERFORMING DOUBLING PROCESS OF POINT */
1905      V=2V;
1906      /* PERFORMING ADDITION OF POINT */
1907      if (d_i ==1) V = V+A';
1908 }
1909 if (d_0==1) V=V+A;
1909 return V;
```

```
-input
d: SECRET KEY, u-bit, EXPRESSED BY d=(d_{u-1}, ..., d_1, d_0)_2 WHERE d_i IS i-TH BIT VALUE OF d.
A: POINT ON OVAL CURVE
-output
V=dA (POINT V OBTAINED BY MULTIPLYING POINT A BY d)

/* make k-bit window W[x] = (2x)A for 0<x<2^k */
2001 W[0]=1; W[1]=2A;
2002 for(i=2;i<2^k;i++) W[i] = W [1]+W[i-1];
2003 V=0; /* V=0 REFERS TO POINT ON OVAL CURVE CORRESPONDING TO v=1, AND A=A+0=0+A  */
2004 for(i=Ceiling((u-1)/k)-1; i>=0; i=i-1) {
2005   /* PERFORMING DOUBLING PROCESS OF POINT k TIMES CONTINUOUSLY */
2006   for (j=0; j<k; j++) V=2V;
2007   /* EXTRACTING BIT VALUE OF d IN k-bit UNITS, AND PROVIDING THE VALUE FOR b_i  */
2008   b_i= (d_{ik+k}, ..., d_{ik+1})_2
2009   /* PERFORMING ADDITION OF POINT */
2010   V =V+W [b_i];
2011 }
2012 if (d_0==1) V=V+A;
2013 return V;
```

```
-input
d: SECRET KEY, u-bit, EXPRESSED BY d=(d_{u-1}, ..., d_1, d_0)_2 WHERE d_i IS i-TH BIT VALUE OF d.
A: POINT ON OVAL CURVE
-output
V=dA (POINT V OBTAINED BY MULTIPLYING POINT A BY d)

/* make k-bit window W[x] = (2x)A for 0<x<2^k */
2101   W[0]=1; W[1]=2A;
2102   for (i=2; i<2^k; i++) W[i] = W[1]+ W[i 1];
2103   i=Ceiling((u-1)/k)-1
2104   b_i= (d_{ik+k}, ..., d_{ik+1})_2
2105   V=W[b_i];
2106   for (i=Ceiling((u-1)/k)-2 ; i>=0; i=i-1) {
2107     /* PERFORMING DOUBLING PROCESS OF POINT k TIMES CONTINUOUSLY */
2108     for (j=0; j<k; j++) V=2V;
2109     /* EXTRACTING BIT VALUE OF d IN k-bit UNITS, AND PROVIDING THE VALUE FOR b_i */
2110     b_i= (d_{ik+k}, ..., d_{ik+1})_2
2111     /* PERFORMING ADDITION OF POINT */
2112     V=V+W[b_i];
2113   }
2114   if (d_0==1) V=V+A;
2115   return V;
```

FIG. 21

ENCRYPTING METHOD HAVING COUNTERMEASURE FUNCTION AGAINST POWER ANALYZING ATTACKS

CROSS-REFERENCE TO RELATED APPLICATIONS

This application is a continuation of PCT application No. PCT/JP2008/000833, which was filed on Mar. 31, 2008, the entire contents of which are incorporated herein by reference.

FIELD

The present invention relates to a field of encryption, and more specifically to the tamper-resistant technology for protecting a secret key in an encryption processor against power analyzing attacks.

BACKGROUND

Encrypting systems can be roughly classified into a common key encrypting system and a public key encrypting system. The common key encrypting system uses the same key (secret key) in encrypting and decoding processes, and maintains the security by defining the secret key as the information unknown to the third parties other a transmitter and a receiver. The public key encrypting system uses keys different between encrypting and decoding processes, and maintains the security by defining a key (secret key) for decoding cipher text as secret information for only a receiver instead of publishing to common users a key (public key) for encryption.

One of the techniques in the field of encryption is decrypting technique. The decrypting technique is to estimate secret information such as a secret key from available information such as cipher text etc., and there are a number of methods. One of the techniques recently receiving widespread attention is a method called power analyzing attacks. The power analyzing attacks was devised by Paul Kocher in 1998 to estimate key information in an encryption processor by collecting and analyzing power consumption data obtained when various input data are provided for an encryption processor loaded into a smart card etc. It is known that a secret key of both common key encryption and public key encryption can be estimated from an encryption processor by using the power analyzing attacks.

There are two types of power analyzing attacks, that is, a simple power analysis (hereinafter referred to as an SPA) and a differential power attacks (hereinafter referred to as a DPA). The SPA is a system of estimating a secret key from the characteristics of a single piece of power consumption data in the encryption processor, and the DPA is a system of estimating a secret key by analyzing a difference in a large number of pieces of power consumption data.

The estimating method using the SPA and the DPA for the common key encrypting systems such as a DES and an AES is described in detail in the following non-patent document 1 (hereinafter referred to as the Kocher 99).

The estimating using the SPA and the DPA for the public key encryption such as the RSA encryption, the oval curve encryption, etc. is described in the documents such as the non-patent document 2 (Messerges 99), the non-patent document 3 (Coron 99), etc.

Calculating Method of RSA Encryption (Prior Art)

In the process of decoding an RSA encryption, an exponential remainder calculating process is performed. The exponential remainder calculation is to calculate plain text v by $v=a^d \pmod n$ on a secret key d, cipher text a, and a modulo n. Generally, since the bit length of the secret key d in the RSA encryption is 1024 bits or more, it is necessary to perform $2^{1024}$ multiplications if the d-th powered multiplication is performed in a simple method, thereby disabling the entire calculation to be completed within a practical time.

There is a binary method or a window method as an algorithm for efficiently performing the process. The binary method is described on page 614, algorithm 14.79 of the following non-patent document 4. The window method is described on page 615, algorithm 14.82 of the document 4. Using these methods, the necessary calculation frequency for the d-th powered multiplication can be reduced from $2^{1024}$ to a multiple of a constant (1.5 or less) of 1024, thereby realizing an efficiency calculation.

The secret key d is expressed by a u-bit value, and the binary expression is $d=(d_{u-1}, d_{u-2}, \ldots, d_0)_2$. However, $d_i$ indicates a bit value of each "d". FIG. 1 illustrates the algorithm of the exponential remainder calculation in the binary method, and FIG. 2 illustrates the algorithm of the exponential remainder calculation for calculating $v=a^d$ mod n by the window method.

FIG. 3 illustrates the outline of the calculation performed in the binary method illustrated in FIG. 1, and FIG. 4 illustrates the outline of the calculation performed in the window method illustrated in FIG. 2.

The process illustrated in FIG. 1 is described below. The bit value $d_i$ of d is checked in the order from i=u−1 to i=0. As a result of the check, if $d_i=1$, both a squaring and a multiplication are performed. If $d_i=0$, only the squaring is performed. By repeating the process from i=u−1 to i=0, the calculation of $v=a^d \pmod n$ is performed. That is, the characteristic of the binary method is that the value of the key bit $d_i$ directly cooperates with the execution pattern of the squaring and the multiplication.

The process illustrated in FIG. 2 is described below. The process of generating $w[x]=a^x \pmod n$ is first performed on $0<x<2^k$. After the table generating process, the $d=(d_{u-1}, d_{u-2}, \ldots, d_0)_2$ in the u-bit value is divided into k-bit units to generate Ceiling(u/k) sequences $b_i$ (i=0, 1, . . . ). That is, $b_i=(d_{ik+k-1}, \ldots, d_{ik})_2$. The Ceiling(x) indicates the minimum value of the integer equal to or exceeding x. For example, Ceiling(7/3)=Ceiling(2.333 . . . )=3 and Ceiling(10/5)=Ceiling(2)=2. The Ceiling(u/k) indicates the number of divisions when the u-bit bit string is divided into k-bit units. By repeating the table indexing process ($v=v'w[b_i]$) using $b_i$, and the $2^k$-th powered multiplication (a squaring is performed k times) expressed by $v=v^{2^k} \pmod n$, $v=a^d \pmod n$ is calculated. Unlike the binary method, the pattern in which the squaring is repeated k times and the multiplication is performed once is repeated regardless of the value of the key bit $d_i$ in the window method.

In the following explanation, the sequence $b_i$ used in the table index in the window method is referred to as a "window sequence".

<Power Analyzing Attacks Against the RSA Encrypting Process (Prior Art)>

The power analyzing attacks against the RSA encrypting process described with reference to FIGS. 1 and 2 are described below.

The means and results of attacks depend on the RSA processing method, that is, whether the RSA processing method is the binary method or the window method described below.

Binary Method

Information determined by an attacker from power consumption: Squaring or multiplication is identified.

Key information obtained by an attacker: All bit values (all u bits) of a secret key Window Method Information determined by an attacker from power consumption: Whether each window sequence $b_i$ is an even number or an odd number.

Key information obtained by an attacker: Ceiling(u/k) bits in u bits of a secret key are decrypted. One bit is decrypted every k-th bit.

As described above, if the bit value of a secret key is 1 in the binary method, then a multiplication and a squaring are performed. If the bit value is 0, then only the squaring is performed. Therefore, in the binary method, if the squaring or the multiplication can be identified depending on the power consumption, all bits of d can be decrypted.

However, in the window method, the execution patterns of the squaring and the multiplication are always constant regardless of the value of the secret key. Therefore, no attacks can be effective in the method of identifying squaring or multiplication as described above. Instead, it is determined whether each window sequence $b_i$ is an even number or an odd number using a power consumption waveform. By performing the determination, the least significant bit of $b_i$ as the k-bit value can be decrypted. As illustrated in FIG. 4, the window sequence $b_i$ is a value delimiting the secret key d in k bit units. Therefore, the bit value of d can be decrypted for each bit every k-th bit.

<Power Analyzing Attacks Against the Binary Method (FIG. 1)>

The method of identifying squaring or multiplication is described below using a power consumption waveform. The identifying method is known as the two following attack methods, that is, the attack method 1 and the attack method 2. Used in these identifying methods is the characteristic that the power consumption waveform of a multiplying process depends on the data value of a multiplication.

Attack Method 1

After inputting a=−1 (mod n) as a value of the cipher text a, the decoding process is performed using the secret key d, and the power consumption is measured. By inputting the cipher text, that is, a=−1 (mod n), the pattern of the data value of the multiplication performed in the decoding process is limited to the following three types.

Multiplication: one type—(1)×(−1)

Squaring: two types—(1)×(1), (−1)×(−1)

FIG. 5 is an example of a power consumption waveform when a=−1 (mod n) is input for d=(10100)$_2$. While a total of seven calculations including multiplication and squaring are performed, only three patterns are applied to the waveforms of power consumption. An attacker observes these waveform patterns, and identifies the execution order of squaring and multiplication.

The attacker has to identify the three types of waveform patterns, and then determines whether each waveform pattern corresponds to the multiplication or the squaring. However, since there are at most six variations of combinations of three types of waveform patterns and the multiplication and the squaring, the values of the key can be limited to 6 types. When the value of d is 1024 bits, $2^{1024}$ operations are required to obtain a key by a round robin algorithm, but this method can limit the operations to 6 calculations.

When the characteristics of the algorithm in FIG. 1 is further considered, the six calculations can be reduced to one calculation. First, since the waveform to be first used is necessarily (1)×(1) based on the characteristic of the algorithm in FIG. 1, it can be determined which waveform is used as a multiplication waveform for (1)×(1) in the three types of waveform patterns. Since the waveform pattern after performing the multiplication of (1)×(1) is limited to the two types from the characteristic of the algorithm illustrated in FIG. 1, that is, (1)×(1) and (1)×(−1), it is determined that the waveform pattern after the leftmost waveform pattern of (1)× (1) in FIG. 5 is (1)×(−1) because of the difference of the waveform. Thus, the waveform pattern after the leftmost multiplication waveform of (1)×(1) is the waveform of (1)×(−1). Since the waveform pattern of squaring expressed by (−1)× (−1) must be immediately after the multiplication of (1)×(−1) from the characteristic of the algorithm illustrated in FIG. 1, the waveform of (−1)×(−1) can also be determined.

When the value other than −1 is input to a, the data value of the multiplication performed in the loop of the multiplication and squaring of i=u−1, ..., 1, 0 in FIG. 1 is not limited to the three types above, but the multiplying process can be performed using the data value different each time the multiplication and the squaring are performed. Therefore, all multiplication waveforms are different and appear to an attacker as a list of random waveform patterns. Accordingly, squaring or multiplication cannot be identified. Therefore, only when a=−1 is input, the data value of the multiplication is limited to three patterns, thereby enabling squaring or multiplication to be identified because the patterns of waveforms are limited to three types.

Attack Method 2

In the attack method 1, squaring or multiplication is identified by inputting a=−1(mod n) and observing a single power waveform. On the other hand, in the attack method 2 described below, the power consumption waveform obtained when a=s(mod n) is input and the power consumption waveform obtained when a=−s(mod n) is input are separately measured, and the difference waveforms are observed, thereby identifying squaring or multiplication. In this case, s indicates an optional data value, and can be freely selected by an attacker.

As with the attack method 1, the identifying method of the attack method 2 also has the characteristic that the power consumption waveform in the multiplying process depends on the data value of multiplication.

The difference waveform between the power consumption waveform obtained when a=s(mod n) is input and the power consumption waveform obtained when a=−s(mod n) is input is limited to three patterns depending on whether the calculation being performed is multiplication or squaring. The principle is first described below.

When the power consumption waveform obtained when a=s(mod n) is input is compared with the power consumption waveform obtained when a=−s(mod n) is input with the same timing, the contents of the calculations performed with the respective power consumption waveforms are described below.

Multiplication: The available pattern of the data values of multiplication is one pattern below.

[Pattern 1]

When a=s is input, the multiplication of vs=v×s (mod n) is performed. where v is intermediate data being calculated, and a variable v in FIG. 1.

When a=−s is input, the multiplication of −vs=v×−s (mod n) is performed. where v is intermediate data being calculated, and a variable v in FIG. 1. The value of v is equal to the value of v when a=s is input.

In the case of "pattern 1", the difference in data value in the multiplying process of C=A×B (mod n) between when a=s is input and when a=−s is input is considered. The values of A are the same, but the values of C and B are different. Therefore, as for the difference waveform between when a=s is input and when s=−s is input in the multiplying process, the waveform difference of the processed portion for the value of A is flat while the processed portions for the values of B and C indicate waveforms of large amplitude because of different data values.

Squaring: The available patterns of the data values of squaring is two patterns below.

[Pattern 2]

When a=s is input, the squaring of $v^2=v \times v$ (mod n) is performed. where v is intermediate data being calculated, and a variable v in FIG. 1.

When a=−s is input, the squaring of $v^2=-v \times -v$ (mod n) is performed. where v is intermediate data being calculated, and a variable v in FIG. 1. The value of v is equal to the value of v when a=s is input.

In the case of "pattern 2", the difference in data value in the multiplying process of C=A×B (mod n) between when a=s is input and when a=−s is input is considered. The values of C are the same, but the values of A and B are different. Therefore, as for the difference waveform between when a=s is input and when s=−s is input in the multiplying process, the waveform difference of the processed portion for the value of C is flat while the processed portions for the values of A and B indicate waveforms of large amplitude because of different data values.

[Pattern 3]

When a=s is input, the multiplication of $v^2=v \times v$ (mod n) is performed. where v is intermediate data being calculated, and a variable v in FIG. 1.

When a=−s is input, the multiplication of $v^2=v \times v$ (mod n) is performed. where v is intermediate data being calculated, and a variable v in FIG. 1. The value of v is equal to the value of v when a=s is input.

In the case of "pattern 3", the difference in data value in the multiplying process of C=A×B (mod n) between when a=s is input and when a=−s is input is considered. All values of A, B, and C are the same. Therefore, as for the difference waveform between when a=s is input and when s=−s is input in the multiplying process, the waveform is completely flat because all values of A, B, and C are the same values.

As described above, the difference waveform obtained between when a=s is input and when a=−s is input can be limited to the waveforms of three patterns depending on the calculation being performed, that is, multiplication of squaring. FIG. 6 is an example of the difference waveform based on the characteristic above.

As illustrated in FIG. 6, a waveform pattern of three types only is obtained by setting the difference waveform obtained between when a=s is input and when a=−s is input. The squaring by the "pattern 3" indicates a completely flat waveform, can be easily identified, and corresponds to the first waveform in FIG. 6. Due to the characteristic of the algorithm in FIG. 1, the squaring of the "pattern 3" is first performed. It is finally necessary to identify the between the multiplication by the "pattern 1" and the squaring by the "pattern 2", but since there are only two types of the correspondence between the "pattern 1" and the "pattern 2" and the multiplication and the squaring even in the round robin algorithm, the value of the key can be narrowed to two types although the correspondence is not known. Furthermore, if a single or a plurality of waveforms of "pattern 3" continue, from the characteristic of the algorithm in FIG. 1, the "pattern 1" is set. Therefore, the "pattern 1" as a difference waveform can be uniquely identified. In the case in FIG. 6, the waveform as the second waveform from the left corresponds to the "pattern 1". The waveform of the "pattern 1" in FIG. 6 indicates the characteristic that the left portion is flat and the width of the other portions is large. From the characteristic of the algorithm in FIG. 1, the last "pattern 2" comes immediately after the "pattern 1". In the case in FIG. 6, the waveform as the second waveform from the left corresponds to the "pattern 1". The waveform of the "pattern 1" in FIG. 6 indicates the characteristic that the right portion is flat and the width of the other portions is large.

As described above, the attacker identifies the waveform of the "pattern 1", "pattern 2", or "pattern 3", thereby identifying squaring or multiplication and obtaining all values of secret key.

<Power Analyzing Attacks Against Window Method (FIG. 2)>

The method of identifying the window sequence $b_i$ as an even number or an odd number is described below using a power consumption waveform. The identifying method is known as the two following attack methods, that is, the attack method 3 and the attack method 4. Used in these identifying methods is the characteristic that the power consumption waveform of a multiplying process depends on the data value of a multiplication.

Attack Method 3

As with the attack method 1, after inputting a=−1(mod n) as a value of the cipher text a, the decoding process is performed using the secret key d, and the power consumption is measured. By inputting the cipher text, that is, a=−1(mod n), the pattern of the data value of the multiplication performed in the decoding process is limited to the following three types as with the attack method 1.

Multiplication: two types—(1)×(−1) or (1)×(1)

Squaring to be performed k times: two types—After once performing (−1)×(−1), (1)×(1) is performed k−1 times or (1)×(1) is performed k times.

In the calculations above, the attacker has to identify two types of multiplication. (It is not necessary to identify two types of squaring.) The identification of the multiplication is necessary because the multiplication of (1)×(−1) indicates $b_i$ as an odd number, and the multiplication of (1)×(1) indicates $b_i$ as an even number. The cooperation of the even number and the odd number of $b_i$ and the type of multiplication is performed because the multiplication $v=v \times w[b_i]$ using a table $w[b_i]$ expressed by $w[b_i]=a^{bi}$ (mod n) is performed as illustrated in FIG. 2, thereby obtaining the table $w[b_i]$ as −1 powered by an odd number, that is, −1, if a=−1 and $b_i$ is an odd number, while obtaining the table $w[b_i]$ as −1 powered by an even number, that is, 1 if $b_i$ is an even number.

As described above, if two types of multiplication can be identified by a power waveform, it can be determined whether $b_i$ is an even number or an odd number. Afterwards, two types of multiplication can be identified if an attacker is informed of the timing of the performance of the multiplication, which is quite simple because, from the characteristic of the algorithm illustrated in FIG. 2, a regular process of only performing the multiplication after performing the squaring k times, thereby enabling the attacker to be informed that the multiplication is necessarily performed with the waveform after the squaring is performed k times.

Therefore, the attacker can identify the window sequence $b_i$ as an even number or an odd number by identifying the two types of multiplication only on the waveform with the timing of the performance of the multiplication.

FIG. 7 is an example of the power consumption waveform when a=−1(mod n) is input for k=3, d=$(101100)_2$. The calculation pattern in which the squaring is performed three times and the multiplication is performed once is repeated once, and a total of eight calculations are performed. The attacker can determine whether $b_i$ is an odd number or an even number by observing the waveform of the multiplication performed every fourth calculation. In this case, since d is 6 bits, a calculation using two windows of $b_1$, $b_0$ is performed.

In this case, $b_1$ is higher order 3 bits of d, and $b_0$ is low order 3 bits of d. First, after the squaring by (1)×(1) is performed three times, the multiplication by $w[b_i]$ is performed. The multiplication waveform is the fourth waveform from the left, and is quite different from the multiplication waveform of (1)×(1). Therefore, $b_1$ can be identified as an odd number. (If the fourth waveform from the left is the same as the multiplication waveform of (1)×(1), $b_1$ can be identified as an even number.

Then, after the squaring of (−1)×(1) is once performed and the squaring of (1)×(1) is twice performed, the multiplication by $w[b_0]$ is performed. The multiplication waveform is the eighth form from the left (or the rightmost waveform), and has the same form as the multiplication waveform of (1)×(1). Therefore, $b_0$ can be identified as an even number.

As described above, the attacker can decrypt that the bit value of d is $d=(10)_2$, and can decrypt two bits in 6 bits of d for every 3 bits.

Attack Method 4

As with the attack method 2, each of the power consumption waveform obtained when a=s(mod n) is input and the power consumption waveform obtained when a=−s(mod n) is input is measured, and the difference waveform is observed with respect to the multiplication, thereby allowing $b_i$ to be determined as an even number or an odd number where s is an arbitrary data value and the attacker can freely select the value.

As with the description of the attack method 3, the multiplication of $v=v \times w[b_i]$ using the table $w[b_i]$ expressed in $w[b_i]=a^{bi}$ (mod n) is performed in the algorithm in FIG. 2. Since the difference of the multiplication data $w[b_i]$ between when a=s is input and when a=−s is input depends on whether $b_i$ is an even number or an odd number, $b_i$ can be identified as an even number or an odd number using the difference of the multiplication waveform.

When $b_i$ is an even number, a=s and a=−s generate the same data $w[b_i]=s^{bi}$ (mod n). Therefore, when the difference between a=s and a=−s is obtained on the multiplication waveform of $v=v \times w[b_i]$, a flat waveform is obtained. On the other hand, when $b_i$ is an odd number, a=s generates $w[b_i]=s^{bi}$ (mod n), but a=−s generates $w[b_i]=-s^{bi}$ (mod n). Therefore, when the difference between a=s and a=−s is obtained on the multiplication waveform of $v=v \times w[b_i]$, a waveform having large amplitude is obtained.

FIG. 8 is an example of the power consumption waveform when a=s and a=−s is input for k=3, $d=(101100)_2$. The calculation pattern in which the squaring is performed three times and the multiplication is performed once is repeated once, and a total of eight calculations are performed. The attacker can determine whether $b_i$ is an odd number or an even number by observing the waveform of the multiplication performed every fourth calculation. In this case, since d is 6 bits, a calculation using two windows of $b_1$, $b_0$ is performed. In this case, $b_1$ is higher order 3 bits of d, and $b_0$ is low order 3 bits of d. First, after the squaring by (1)×(1) is performed three times, the multiplication by $w[b_i]$ is performed. The multiplication waveform is the fourth waveform from the left, and the difference waveform between a=s and a=−s is not a completely flat waveform. Therefore, $b_1$ can be identified as an odd number. (If the fourth difference waveform from the left is the same as the completely flat waveform, $b_1$ can be identified as an even number.)

Then, after the squaring is performed three times, the multiplication by $w[b_0]$ is performed. The multiplication waveform is the eighth form from the left (or the rightmost waveform), the difference waveform is completely flat. Therefore, $b_0$ can be identified as an even number.

As described above, the attacker can decrypt that the bit value of d is $d=(10)_2$, and can decrypt two bits in 6 bits of d for every 3 bits.

By the consideration above, the present invention solves the following problems.

Problem 1: Using the binary method, a safe RSA encrypting process is performed on the attack methods 1 and 2.

Problem 2: Using the window method, a safe RSA encrypting process is performed on the attack methods 3 and 4.

To solve the problems 1 and 2, it is necessary to perform a safe process on the attack methods 1, 2, 3, and 4. Each attack method has the characteristic that the power consumption in the multiplying process depends on the data value of the multiplication. That is, the characteristic with respect to the power consumption causes the problems. The descriptions can be summed up as follows Attack Method 1

When a=−1 is input, only the following three types of calculations are performed. By identifying these three types by the power waveform, all bit values of d are decrypted.

multiplication: one type of (1)×(−1)

squaring: two types of (1)×(1) and (−1)×(−1).

Attack Method 2

The waveform difference obtained between when a=s is input and when a=−s is input occurs in the following three types of calculations. By identifying these three types by the power waveform, all bit values of d are decrypted.

multiplication: the difference between the waveform of (v)×(s) and the waveform of (v)×(−s) (one type)

squaring: the difference between the waveform of (−v)×(−v) and (v)×(v), or the difference between the waveform of (v)×(v) and (v)×(v) (two types).

Attack Method 3

When a=−1 is input, only the following two types of calculations are performed. By identifying these two types by the power waveform, 1/k bit values of all of d are decrypted.

multiplication: (1)×(−1), (1)×(1)

Attack Method 4

The waveform difference obtained between when a=s is input and when a=−s is input occurs only in the following two types of multiplications. By identifying these two types by the power waveform, 1/k bit values of all of d are decrypted.

multiplication: the difference between the waveform of (v)×(s) and the waveform of (v)×(−s), or the difference between the waveform of (v)×(s) and the waveform of (v)×(s) (two types).

The following non-patent documents 1 through 4 are cited in the explanation above.

Non-patent Document 1: Paul Kocher, Joshua Jaffe, and Benjamin Jun, "Differential Power Analysis," in proceedings of Advances in Cryptology-CRYPTO '99, Lecture Notes in Computer Science vol. 1666, Springer-Verlag, 1999, pp. 388-397 (hereinafter referred to as Kocher 99)

Non-patent Document 2: Thomas S. Messerges, Ezzy A. Dabbish and Robert H. Sloan "Power Analysis Attacks of Modular Exponentiation in Smartcards", Cryptographic Hardware and Embedded Systems (CHES' 99), Lecture Notes in Computer Science vol. 1717, Springer-Verlag, pp. 144-157 (hereinafter referred to as Messerges 99)

Non-patent Document 3: Jean-Sebastein Coron "Resistance against Differential Power Analysis for Elliptic Curve Crytosystems", Cryptographic Hardware and Embedded Systems (CHES' 99), Lecture Notes in Computer Science vol. 1717, Springer-Verlag, pp. 292-302, 1999 (hereinafter referred to as Coron 99)

Non-patent Document 4: Alfred J. Menezes et al. "HANDBOOK OF APPLIED CRYPTOGRAPHY" (CRC press), (http://www.cacr.math.uwaterloo.ca/hac/about/chap14.pdf)
In addition, relating to the problems of the present invention, the following patent documents 1 through 3 describe published examples.

Patent Document 1: National Publication of International Patent Application No. 2004-519132
Patent Document 2: Japanese Laid-open Patent Publication No. 2002-261753
Patent Document 3: Japanese Laid-open Patent Publication No. 2004-226674

SUMMARY

The documents above are common in that the attacker identifies the difference in plus and minus data values using the power waveform in the multiplication or the squaring. Therefore, all attack methods 1, 2, 3, and 4 can be rejected if the identification of the plus and minus data values can be rejected.

The present invention is a countermeasure technique for preventing the estimation of a secret key by the SPA and the DPA for the processor for processing public key encryption such as RSA encryption, oval curve encryption, etc., and makes it hard to estimate a secret key using the SPA and the DPA by applying the technique according to the present invention, thereby realizing an encryption processor having high tamper-resistance.

The first aspect of the present invention has the following configuration based on the encrypting method of performing an exponential remainder calculation $y=a^d$ (mod n) from an u-bit exponent $d=(d_{u-1}, \ldots, d_0)_2$, input data a, and a modulo n.

First, calculating $a'=a^2 \pmod n$ is performed.
Next, calculating $y=(a')^f \pmod n$ is performed on $f=(d_{u-1}, d_{u-2}, \ldots, d_1)_2$.
Then, when $d_0=1$, calculating $y=y \times a \pmod n$ is performed.
Then, outputting $y=a^d$ (mod n) is performed.

The second aspect of the present invention has the following configuration based on the encrypting method of performing an exponential remainder calculation $y=a^d$ (mod n) from an u-bit exponent $d=(d_{u-1}, \ldots, d_0)_2$, input data a, and a modulo n using a binary method.

First, performing an initializing process with v=1 is performed.
Next, calculating $a'=a^2 \pmod n$ is performed.
Then, repeating in the order of $i=u-1, u-2, \ldots, 2, 1$ a substep of calculating $v=v \times v \pmod n$, and a substep of calculating $v=v \times a' \pmod n$ with $d_i=1$ is performed.
Furthermore, calculating $v=v \times a \pmod n$ with $d_0=1$ is performed
Then, outputting v as $y=a^d$ (mod n) is performed.

The third aspect of the present invention has the following configuration based on the encrypting method of performing an exponential remainder calculation $y=a^d$ (mod n) from an u-bit exponent $d=(d_{u-1} \ldots, d_0)_2$, input data a, and a modulo n using a binary method.

First, calculating $a'=a^2 \pmod n$ is performed.
Next, performing an initializing process with v=a' is performed.
Then, repeating a substep of calculating $v=v \times v \pmod n$ on $i=u-1, u-2, \ldots, 2, 1$ and a substep of calculating $v=v \times a' \pmod n$ with $d_i=1$ is performed.
Furthermore, calculating $v=v \times a \pmod n$ with g=1 is performed for $g=d_0$.
Then, outputting v as $y=a^d$ (mod n) is performed.

The fourth aspect of the present invention has the following configuration based on the encrypting method of performing an exponential remainder calculation $y=a^d$ (mod n) from an u-bit exponent $d=(d_{u-1}, \ldots, d_0)_2$, input data a, and a modulo n using a window method.

First, generating a table w[x] satisfying $w[x]=(a^2)^x \pmod n$ for $x=0, 1, \ldots, 2^k-1$ is performed with k as a bit width of window.

Next, performing an initializing process with v=1 is performed.

Then, repeating in the order of $i=\text{Ceiling}((u-1)/k)-1, \ldots, 2, 1, 0$ a substep of repeating a squaring process on $v=v \times v \pmod n$ k times, a substep of calculating $b_i=(d_{ik+k}, \ldots, d_{ik+1})_2$ from d, i, k, and a substep of calculating $v=v \times w[b_i] \pmod n$ is performed using e×u as a calculation expressing a minimum value of a set of integer values equal to or exceeding x.

Furthermore, calculating $v=v \times a \pmod n$ with $d_0=1$ is performed.
Then, outputting v as $y=a^d$ (mod n) is performed.

The fifth aspect of the present invention has the following configuration based on the encrypting method of performing an exponential remainder calculation $y=a^d$ (mod n) from an u-bit exponent $d=(d_{u-1}, \ldots, d_0)_2$, input data a, and a modulo n using a window method.

First, generating a table w[x] satisfying $w[x]=(a^2)^x \pmod n$ for $x=0, 1, \ldots, 2^k-1$ is performed with k as a bit width of window.

Next, performing an initializing process of $v=w[b_i]$ for $i=\text{Ceiling}((u-1)/k)-1$ using Ceiling(x) as a calculation expressing a minimum value of a set of integer values equal to or exceeding x is performed.

Then, repeating in the order of $i=\text{Ceiling}((u-1)/k)-2, \ldots, 2, 1, 0$ a substep of repeating the squaring process of $v=v \times v \pmod n$ k times, a substep of calculating $b_i=(d_{ik+k}, \ldots, d_{ik+1})_2$ from d, i, k, and a substep of calculating $v=v \times w[b_i] \pmod n$ is performed.

Furthermore, calculating $v=v \times a \pmod n$ with $d_0=1$ is performed.
Then, outputting v as $y=a^d$ (mod n) is performed.

The sixth aspect of the present invention has the following configuration based on the encrypting method of performing a scalar multiplication Y=dA from the u-bit exponent $d=(d_{u-1}, \ldots, d_0)_2$, and the point A on the oval curve.

First, calculating A'=2A is performed.
Next, calculating the f multiple point of A' Y=fA' is performed on $f=(d_{u-1}, d_{u-2}, \ldots, d_1)_2$.
Furthermore, calculating Y=Y+A is performed with $d_0=1$.
Then, outputting Y=dA is performed.

The seventh aspect of the present invention has the following configuration based on the encrypting method of performing a scalar multiplication Y=dA using the binary method from the u-bit exponent $d=(d_{u-1}, \ldots, d_0)_2$, and the point A on the oval curve.

First, performing an initializing process with V=0 is performed using 0 as an infinity point satisfying A+0=0+A=A on all points A.
Next, calculating A'=2A is performed.
Then, repeating in the order of $i=u-1, u-2, \ldots, 2, 1$ a substep of calculating V=2V, and a substep of calculating V=V+A' with $d_i=1$ is performed.
Furthermore, calculating V=V+A with $d_0=1$ is performed.
Then, outputting V as Y=dA is performed.

The eighth aspect of the present invention has the following configuration based on the encrypting method of performing a scalar multiplication Y=dA using the binary method from the u-bit exponent $d=(d_{u-1}, \ldots, d_0)_2$, and the point A on the oval curve.

First, calculating A'=2A is performed.

Next, performing the initializing process of V=A' is performed.

Then, repeating in the order of i=u−1, u−2, . . . , 2, 1 a substep of calculating V=2V, and a substep of calculating V=V+A' with $d_i$=1 is performed.

Furthermore, calculating V=V+A with g=1 for g=$d_0$ is performed.

Then, outputting V as Y=dA is performed.

The ninth aspect of the present invention has the following configuration based on the encrypting method of performing a scalar multiplication Y=dA using the window method from the u-bit exponent d=$(d_{u-1}, \ldots, d_0)_2$, and the point A on the oval curve.

First, generating a table W[x] satisfying W[x]=(2x)A for x=0, 1, . . . , $2^k-1$ using k as a bit width of the window is performed.

Next, performing an initializing process with V=0 is performed using 0 as an infinity point satisfying A+0=0+A=A on all points A.

Then, repeating in the order of i=Ceiling((u−1)/k)−1, . . . , 2, 1, 0 a substep of repeating k times the doubling process at the point of V=2V and a substep of calculating $b_i$=$(d_{ik+k}, \ldots, d_{ik+1})_2$ from d, i, k is performed using Ceiling(x) as a calculation expressing a minimum value of a set of integer values equal to or exceeding x.

Furthermore, calculating V=V+W[$b_i$] is performed.

In addition, calculating V=V+A with $d_0$=1 is performed.

Then, outputting V as Y=dA is performed.

The tenth aspect of the present invention has the following configuration based on the encrypting method of performing a scalar multiplication Y=dA using the window method from the u-bit exponent d=$(d_{u-1}, \ldots, d_0)_2$, and the point A on the oval curve.

First, generating a table W[x] satisfying W[x]=(2x)A(mod n) for x=0, 1, . . . , $2^k-1$ using k as a bit width of the window is performed.

Next, performing an initializing process of v=w[$b_i$] for i=Ceiling((u−1)/k)−1 using exu as a calculation expressing a minimum value of a set of integer values equal to or exceeding x is performed.

Then, repeating in the order of i=Ceiling((u−1)/k)−2, . . . , 2, 1, 0 a substep of repeating k times the doubling process of the point of V=2V, a substep of calculating $b_i$=$(d_{ik+k}, \ldots, d_{ik+1})_2$ from d, i, k, and a substep of calculating v=v×w[$b_i$] is performed.

Furthermore, calculating V=V+A with $d_0$=1 is performed.

Then, outputting V as Y=dA is performed.

Other aspects of the present invention can be realized as an encryption device, program, or incorporated equipment device with the encryption device incorporated into the equipment device for realizing the aspects above.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an exponential remainder calculation (related art 1) using a common binary method;

FIG. 2 illustrates an exponential remainder calculation (related art 2) using a common window method;

FIG. 9 illustrates the basic procedure according to an embodiment of the present invention;

FIG. 14 is a process flow (obtained by improving the binary method in FIG. 1) according to the first embodiment of the present invention;

FIG. 15 is a process flow (specific to the case with $d_{u-1}$=1 in the first embodiment) according to the second embodiment of the present invention;

FIG. 16 is a process flow (obtained by improving the window method in FIG. 2) according to the third embodiment of the present invention;

FIG. 17 is a process flow (third embodiment improved by a common high-speed method) according to the fourth embodiment of the present invention;

FIG. 18 is a process flow (example of applying the first embodiment to a point scalar doubling process) according to the fifth embodiment of the present invention;

FIG. 19 is a process flow (example of applying the second embodiment to a point scalar doubling process) according to the sixth embodiment of the present invention;

FIG. 20 is a process flow (example of applying the third embodiment to a point scalar doubling process) according to the seventh embodiment of the present invention;

FIG. 21 is a process flow (example of applying the fourth embodiment to a point scalar doubling process) according to the eighth embodiment of the present invention.

DESCRIPTION OF EMBODIMENTS

The best mode for embodying the present invention is described below in detail with reference to the attached drawings.

Basic Principle of each Embodiment According to the Present Invention

The common point in the principles of the attack methods 1, 2, 3, and 4 described in the Background Art above is that an attacker inputs a=−1 and a pair of a=s and −s, thereby intentionally generating a difference between plus and minus data values in multiplication or squaring, and allowing the attacker to identify the difference in data values using a power waveform.

Paradoxically, although an attacker inputs these pieces of data to a, a countermeasure method for protection against the attacks can be realized if a difference in plus and minus data values cannot be intentionally generated in multiplication or squaring.

The basic idea for realizing the countermeasure method is described below. Although an attacker inputs data including a minus value such as a=−1 and a=s, −s, etc., the above-mentioned countermeasure method can be realized if only a plus value can be constantly generated in multiplication and squaring. To constantly generate a plus value, the first input data is squared. That is, when the binary method or the window method illustrated in FIG. 1 or 2 is used, $a^d \pmod n$ is not applied as is to the input a, but f and g satisfying $d = 2 \times f + g$ is applied to d, thereby performing a calculation by $a^d \pmod n = ((a^2)^f) \times a^g \pmod n$. In this case, g is the least significant bit of d, and f is higher order u−1 bits. For the expression of $d=(d_{u-1}, d_{u-2}, \ldots, d_1, d_0)_2$, $f=(d_{u-1}, d_{u-2}, \ldots, d_1)_2$, $g=d_0$ is to be satisfied.

Using the solving means above, the RSA calculation is in accordance with the following procedure in FIG. 9.

As the entire calculating procedure, $(a^2)^f \pmod n$ is calculated and then $a^g \pmod n$ on the result is multiplied. The calculation of $(a^2)^f \pmod n$ is performed by the procedure-2, and the multiplication of $a^g \pmod n$ on the result is performed by the procedure-3. The multiplication by the procedure-3 is not performed with g=0. However, since g=0 means $a^g = a^0 = 1$, it is to be noted that no multiplication is required.

In these calculating procedures, the procedure-1 realizes the protection against the attack methods 1, 2, 3, and 4. The procedure-1 is a process of squaring the input a, and a resultant output of a' is constantly a plus value. For example, when a=−1 is input, $a'=(-1)^2=1$ is obtained. When a=s is input, $a'=(s)^2=s^2$ is obtained. When a=−s is input, $a'=(-s)^2=s^2$ is obtained. Thus, using a' as a constantly plus value, the calculation of $(a')^f \pmod n$ as described in the procedure-2 is performed, thereby protecting against all of the attack methods 1, 2, 3, and 4.

Figure 7:
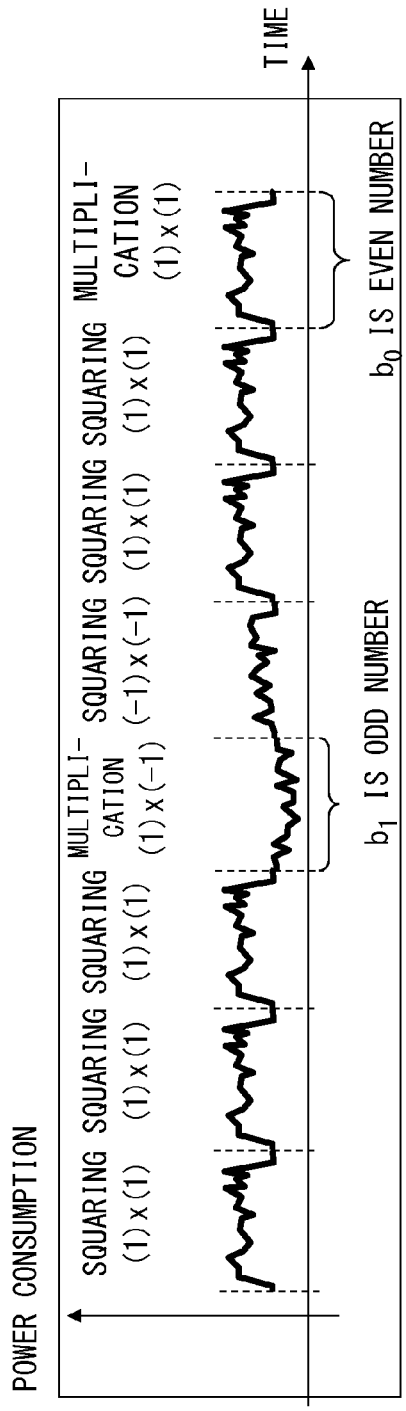
FIG. 7 is an example (attack method 3 as a related art) of a power consumption waveform when a=−1(mod n) and d=$(101100)_2$.
Figure 10:
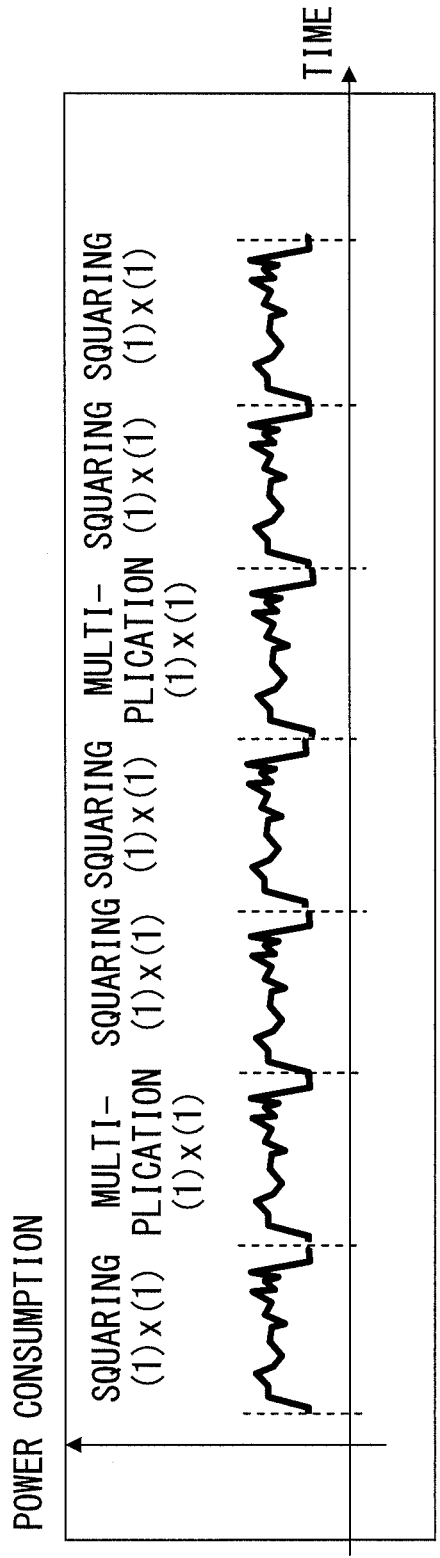
FIG. 10 is an example (indicating the resistance against the attack method 1 according to the present invention) of the power consumption waveform in the binary method according to the present invention when a=−1(mod n) and f=$(10100)_2$.
Figure 11:
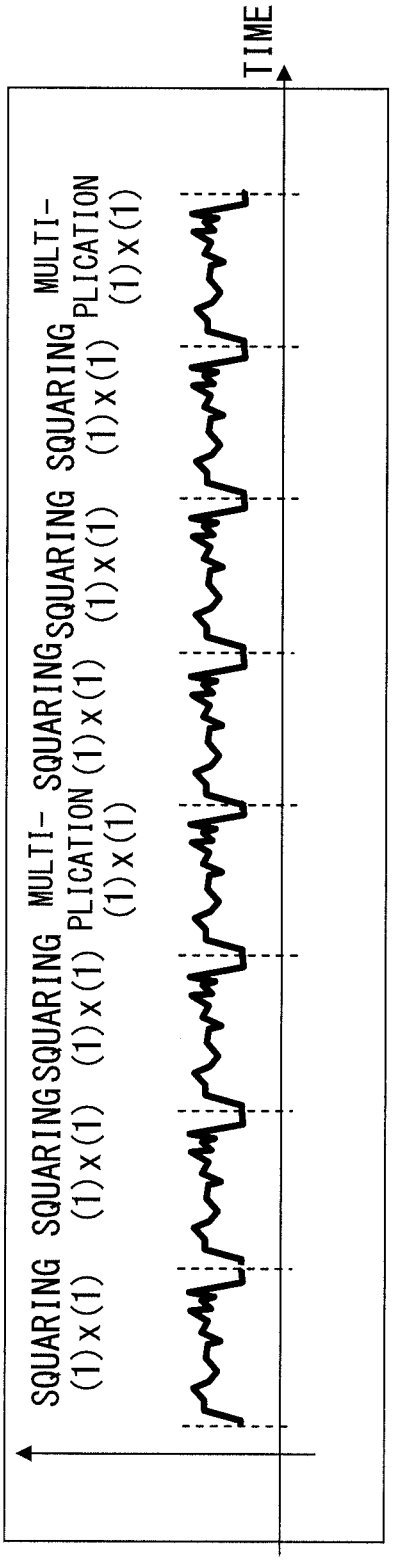
FIG. 11 is an example (indicating the resistance against the attack method 3 according to the present invention) of the power consumption waveform in the window method according to the present invention when a=−1(mod n) and d=$(101100)_2$.

When a=−1 is input in the attack methods such as the attack methods 1 and 3, a'=1 is obtained. Therefore, when the calculation of $(a')^f \pmod n$ is performed in the binary method or the window method, an occurring multiplication or squaring is constantly (1)×(1) only (FIGS. 10 and 11). Therefore, as in the attack methods 1 and 3 illustrated in FIGS. 5 and 7, the calculations of (1)×(1), (−1)×(−1), and (1)×(−1) cannot be identified by a power consumption waveform. Accordingly, the security can be maintained.

Figure 8:
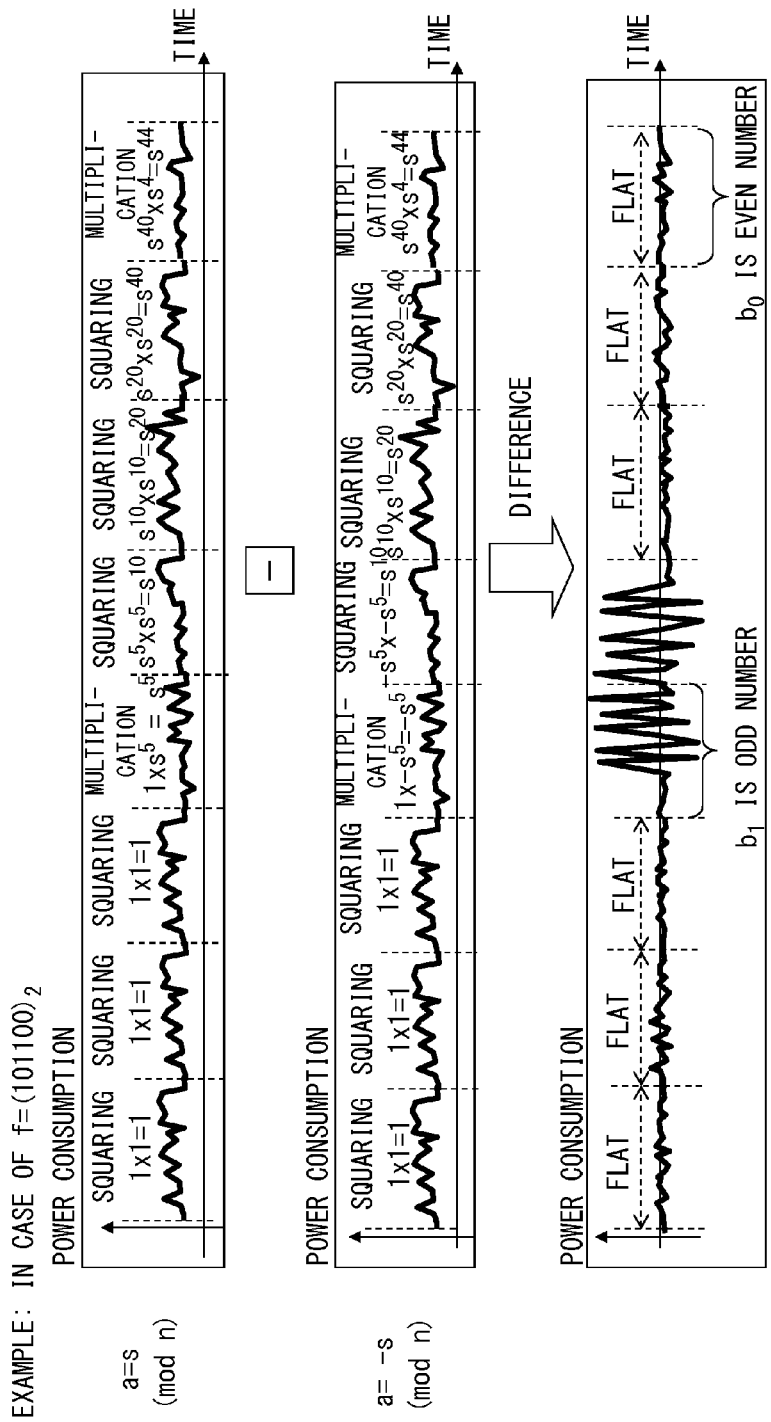
FIG. 8 is an example (attack method 4 as a related art) indicating the difference between the power consumption waveform of a=s(mod n) and the power consumption waveform of a=−s(mod n) with d=$(101100)_2$.
Figure 12:
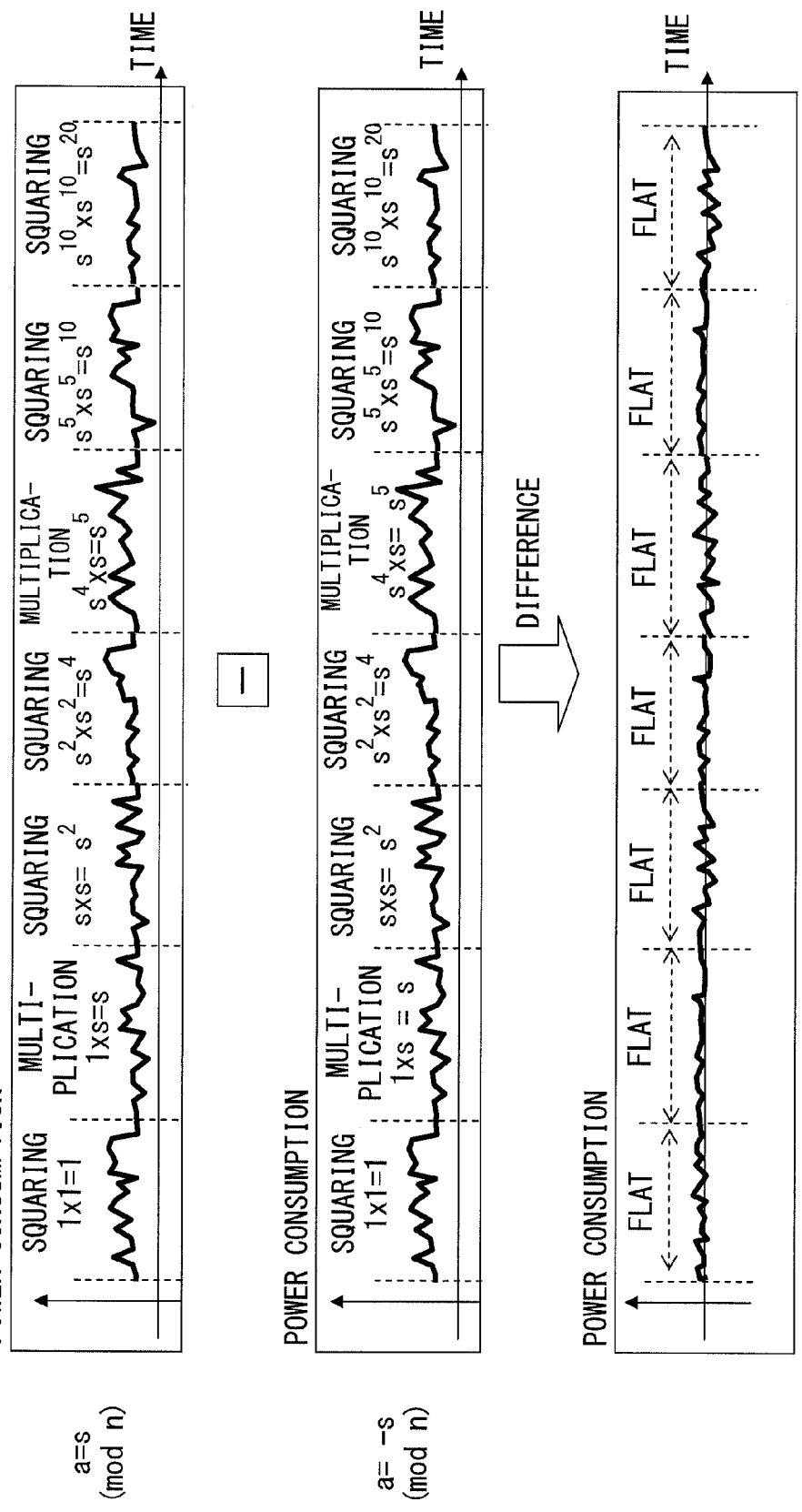
FIG. 12 is an example of a difference waveform of the power consumption waveform between a=s(mod n) and a=−s (mod n) in the binary method according to the present invention with f=$(10100)_2$ (indicating the resistance against the attack method 2 according to the present invention) with f=$(10100)_2$.
Figure 13:
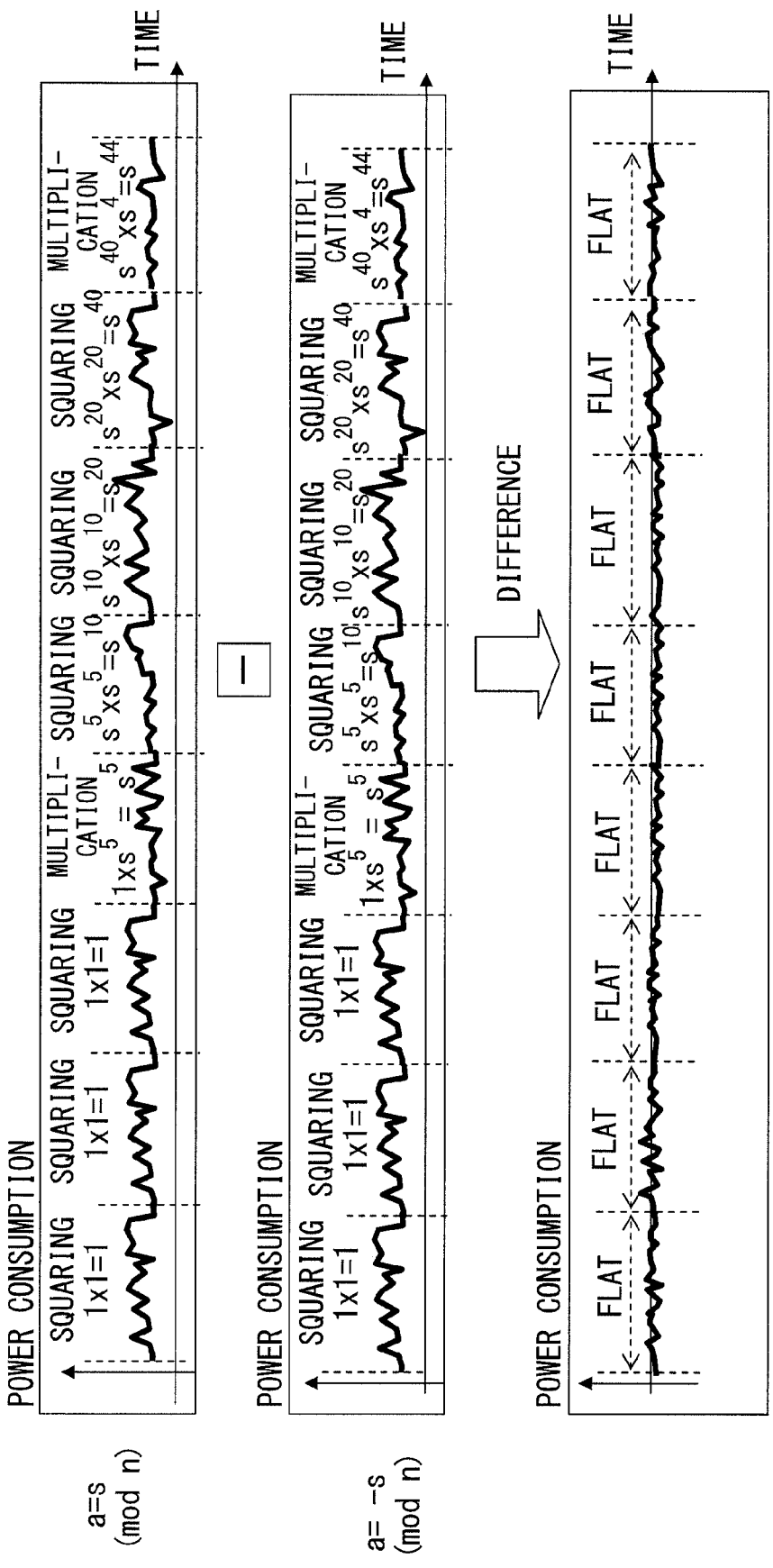
FIG. 13 is an example of a difference waveform of the power consumption waveform between a=s(mod n) and a=−s (mod n) in the window method according to the present invention with f=$(10100)_2$ (indicating the resistance against the attack method 4 according to the present invention) with f=$(101100)_2$.

As in the attack methods 2 and 4 in which a=s and a=−s are input and the difference between the power consumption waveforms is obtained, $a'=s^2$ is obtained by a=s or a=−s. Therefore, the power consumption waveform in the calculation of $(a')^f \pmod n$ indicates the same waveform by a=s or a=−s. As a result, the difference waveform is constantly a flat waveform (FIGS. 12 and 13). Therefore, as indicated by the attack methods 2 and 4 illustrated in FIGS. 6 and 8, the method of decrypting a secret key from the characteristic of a difference waveform cannot be used. Accordingly, the security can be maintained.

Since f is a higher order u−1 bit value of the secret key d, most calculations relating to the secret key d are performed by the procedure-2. However, since calculations using a' as a constantly plus value are performed in the procedure-2, the attacker cannot obtain the information about the secret key. Although a calculation using a not a' is performed only by the procedure-3, the calculations using only the least significant bit of the secret key d are performed in the procedure-3. Therefore, the information obtained by the attacker is the information about the least significant one bit of the secret key. Accordingly, no significant information can be obtained.

First Embodiment of the Present Invention

FIG. 14 illustrates an embodiment obtained by improving the binary method in FIG. 1 using the procedure-1 through procedure-4 in FIG. 9 as the basic principle of the embodiments of the present invention. The characters in bold type in descriptions 1402, 1403, and 1409 are different from the descriptions in FIG. 1, and the process using the solving means in FIG. 9.

The calculation of $a'=a^2 \pmod n$ in the procedure-1 is performed by the description 1402.

The calculation process by the binary method by $(a')^f \pmod n$ in the procedure-2 is performed by the loop process of the description 1403 through 1408. To realize the binary method calculation for $f=(d_{u-1}, \ldots, d_1)_2$, it is to be noted that the loop process of the description 1403 starts with i=u−1 and ends with u=1.

The calculation of the procedure-3 is performed by the description 1409.

Second Embodiment of the Present Invention

FIG. 14 illustrates a general calculation method available when the value of $d_{u-1}$ is 0 or 1, but a binary method algorithm specific to $d_{u-1}=1$ is commonly known. Using the specific algorithm, the problem of calculating time can be a little shortened (one multiplication and one squaring). FIG. 15 illustrates the binary method algorithm specific to the case of $d_{u-1}=1$ in FIG. 14.

The characters in bold type in descriptions 1501, 1502, 1503, and 1509 refer to the process using the solving means in FIG. 9.

The calculation of $a'=a^2 \pmod n$ in the procedure-1 is performed by the descriptions 1501 and 1502. The calculation process by the binary method of $(a')^f \pmod n$ in the procedure-2 is performed by the loop process in the descriptions 1503 through 1508. Since $d_{u-1}=1$ is known, it is to be noted that the process relating to $d_{u-1}$ is skipped in the loop process. To realize the binary method calculation for $f=(d_{u-1}, \ldots, d_1)_2$, the loop process of the description 1503 starts with i=u−2, and ends with u=1.

The calculation in the procedure-3 is performed by the description 1509.

Third Embodiment of the Present Invention

FIG. 16 illustrates an embodiment of improving the window method in FIG. 2 using the solving means in the procedure-1 through procedure-4 in FIG. 9. The characters in bold type in descriptions 1601, 1602, 1604, and 1612 are different from the descriptions in FIG. 2.

The calculation of $a'=a^2 \pmod n$ in the procedure-1 is performed by the table generating process of w[x] by the descriptions 1601 and 1602. In the table generating process in FIG. 2, a table satisfying $w[x]=a^x \pmod n$ is generated. In the table generating process in FIG. 16, a table satisfying $w[x]=(a')^x \pmod n$ is generated for $a'=a^2 \pmod n$. Thus, the table data are constantly plus values.

The calculation process by the window method of $(a')^f \pmod n$ in the procedure-2 is performed by the loop process by the descriptions 1604 through 1611. To realize the binary method calculation for $f=(d_{u-1}, \ldots, d_1)_2$, it is to be noted that the loop process of the description 1604 starts with i=Ceiling ((u−1)/k)−1 and ends with i=0. In FIG. 2, since d as a u-bit value is divided every k bits, the number of divisions is Ceiling(u/k). However, in FIG. 16, (u−1)-bit f is divided every k bits. Therefore, the number of divisions is Ceiling((u−1)/k).

In addition, the bit string from which the least significant bit of d is deleted is f, that is, d and f are shifted by one bit. Therefore, the window sequence $b_i$ is provided as $b_i=(d_{ik+k-1}, \ldots, d_{ik})_2$ in FIG. 2 while it is provided as $b_i=(d_{ik+k}, \ldots, d_{ik+1})_2$ as described by 1608 in FIG. 16.

The process by the procedure-3 is performed by the description 1612.

Fourth Embodiment of the Present Invention

The window method algorithm obtained by improving the calculation of the algorithm in FIG. 2 for a little higher speed (k times of squaring and one multiplication) is commonly known. (Unlike the binary method, the improvement is not subject to the restrictions relating to the secret key d or the window sequence $b_i$.) FIG. 17 illustrates the window method algorithm after the improvement.

The characters in bold type in descriptions 1701 through 1706, and 1714 refer to the process using the solving means in FIG. 9.

The calculation of $a'=a^2 \pmod n$ in the procedure-1 is performed by the table generating process of w[x] described in 1701 and 1072 as in the third embodiment. In the descriptions 1703 through 1705, unlike in FIG. 16, no initializing process is performed by v=1, but the initializing process by $v=w[b_i]$ is performed.

However, $b_i$ is a value satisfying $b_i=(d_{ik+k}, \ldots, d_{ik+1})_2$ for i=Ceiling((u−1)/k)−1.

The calculation process by the binary method of $(a')^f \pmod n$ in the procedure-2 is performed by the loop process in 1706 through 1713. By the initializing process of v described in 1703 through 1705, the calculation process relating to i=Ceiling((u−1)/k)−1 has been completed. Therefore, it is to be noted that the loop process of i starts with i=Ceiling((u−1)/k)−2 and ends with i=0.

In 1710, as in FIG. 16, the window sequence $b_i$ is provided as $b_i=(d_{ik+k}, \ldots, d_{ik+1})_2$.

The process in the procedure-3 is performed by the description 1714.

Other Embodiments of the Present Invention

The first through fourth embodiments above can be applied not only to the RSA encryption but also to all public key encryption calculations using exponential remainder calculations in which output data y is described by $y=c^d \pmod n$ from the exponent d and input data c such as ElGamal encryption, Diffie-Hellman key exchange, DSA signature, etc.

Furthermore, the embodiments can also be applied to the calculations of oval curve encryption. In the ECDSA signature, the ECDH key exchange, etc, a process of calculating a point Y as output data by Y=dA for the secret key d of the RSA and the point A on the oval curve. The calculation is referred to as a scalar multiplication of a point. A point on the oval curve is a vector expressed by A=(X, Y) using two values X and Y. The X and Y are values satisfying $E(X,Y)=0 \pmod p$ for the function E(X,Y) called an oval curve and a prime number p.

In the oval curve encryption, addition of points (Y, A, and B are points on the oval curve) expressed by Y=A+B is performed instead of the multiplication expressed by $y=a \times b \pmod n$, and a doubling process of points (Y and A are points on the oval curve) expressed by Y=2A is performed instead of the squaring. Therefore, to apply the present invention to the oval curve encryption, the decomposition of d=2f+g and the decomposition of Y=fA'+gA (A'=2A) are performed, and the normal binary method or window method is performed to the scalar doubling process of fA.

The embodiments of applying the first embodiment (FIG. 14), the second embodiment (FIG. 15), the third embodiment (FIG. 16), and the fourth embodiment (FIG. 17) to the scalar doubling process of a point are respectively indicated as the fifth embodiment (FIG. 18), the sixth embodiment (FIG. 19), the seventh embodiment (FIG. 20), and the eighth embodiment (FIG. 21).

The calculations are performed by the addition of a point expressed by Y=A+B (Y, A, and B are the points on the oval curve) instead of the multiplication expressed by $y=a \times b \pmod n$, and the doubling process of a point expressed by Y=2A (Y and A are the points on the oval curve) instead of the squaring for each of the first through fourth embodiments.

Figure 22:
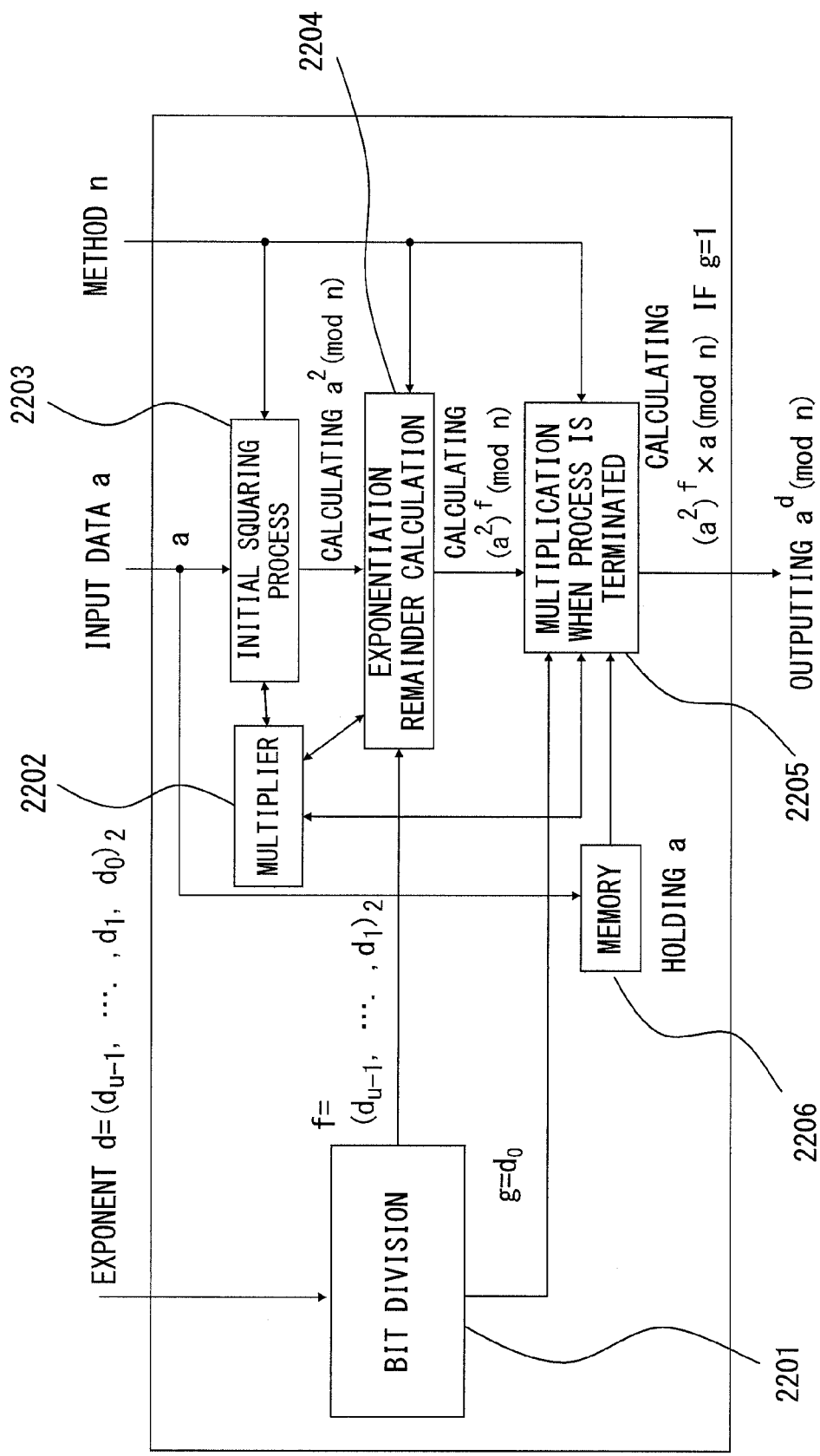
FIG. 22 is the outline of the configuration of the hardware realizing the first through eighth embodiments of the present invention.

Finally, FIG. 22 is the configuration of the outline of the hardware for realizing the first through eighth embodiments of the present invention.

In FIG. 22, an initial squaring unit 2203 performs a calculation of the procedure 1 in FIG. 9 using a multiplication unit 2202.

An exponentiation remainder calculation unit 2204 performs a calculation of the procedure 2 in FIG. 9 using f obtained by a division as higher order u−1 bits of d by the bit division unit 2201.

An ending time multiplication unit 2205 performs a calculation of the procedure 3 in FIG. 9 using a stored in memory 2206 when g=1, and outputs a calculation result.

In addition, the process of each embodiment of the present invention illustrated in FIGS. 14 through 21 can also be realized as an operation of a CPU executing a control program loaded into main storage memory for realizing each function stored in an auxiliary storage device etc. in a common computer having a configuration in which the CPU (central processing unit), the main storage memory, the auxiliary storage device, an input/output device, etc. mutually connected to one another via a bus.

As described above, in each of the embodiments of the present invention, all of the attack methods 1, 2, 3, and 4 which cannot be rejected by the related art illustrated in FIGS. 1 and 2 can be rejected by performing a calculation using a conversion by $a'=a^2 \pmod n$.

By the effect of the present invention, a characteristic indicating a sign of a secret key does not appear in a power consumption waveform. Therefore, an attacker cannot obtain the information about a secret key.

Figure 3:
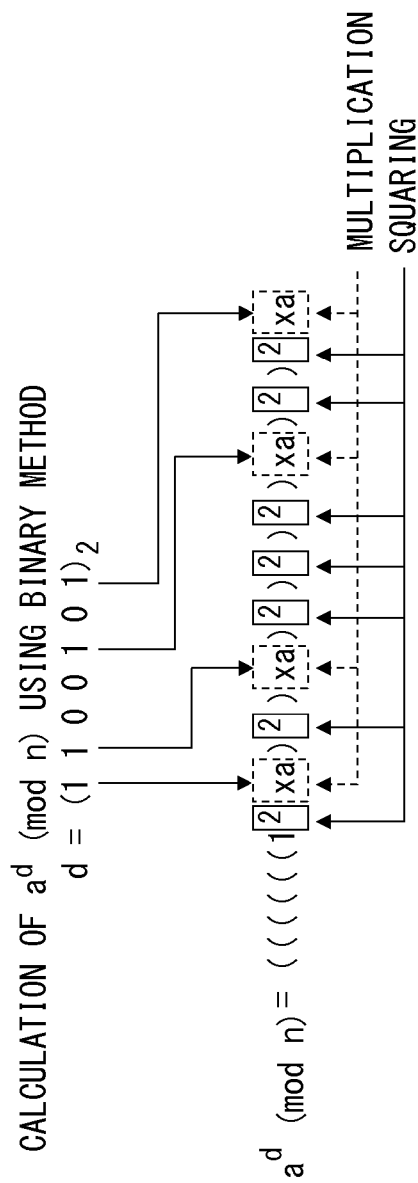
FIG. 3 illustrates the outline of the process of the binary method in FIG. 1.
Figure 4:
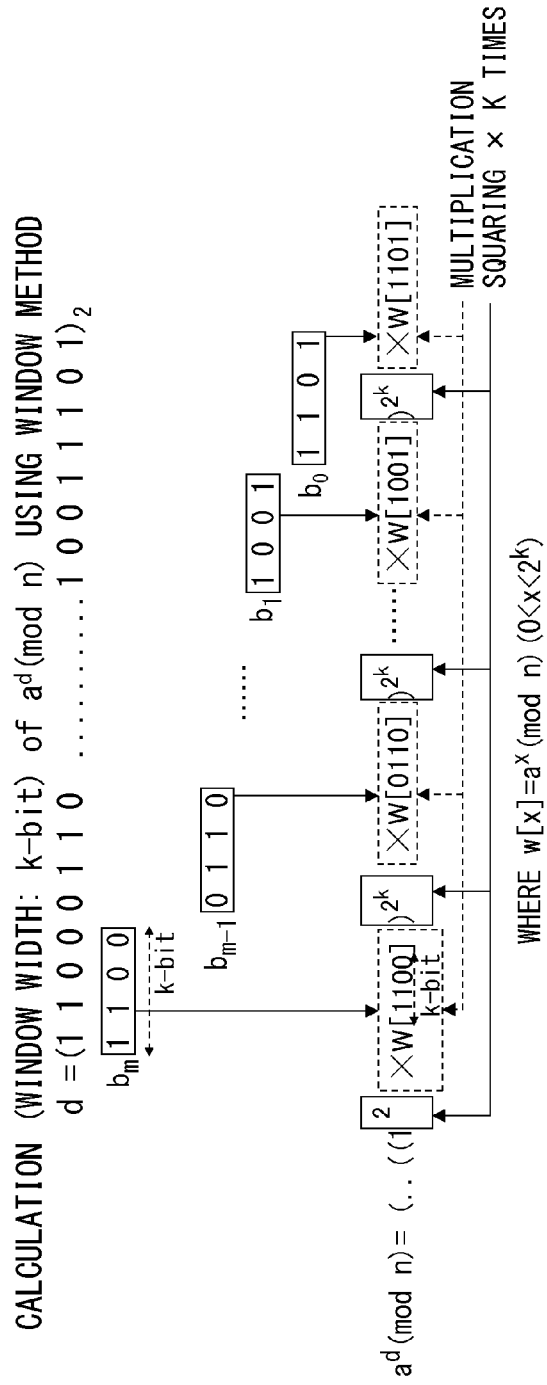
FIG. 4 illustrates the outline of the process of the window method in FIG. 1 with k=4.
Figure 5:
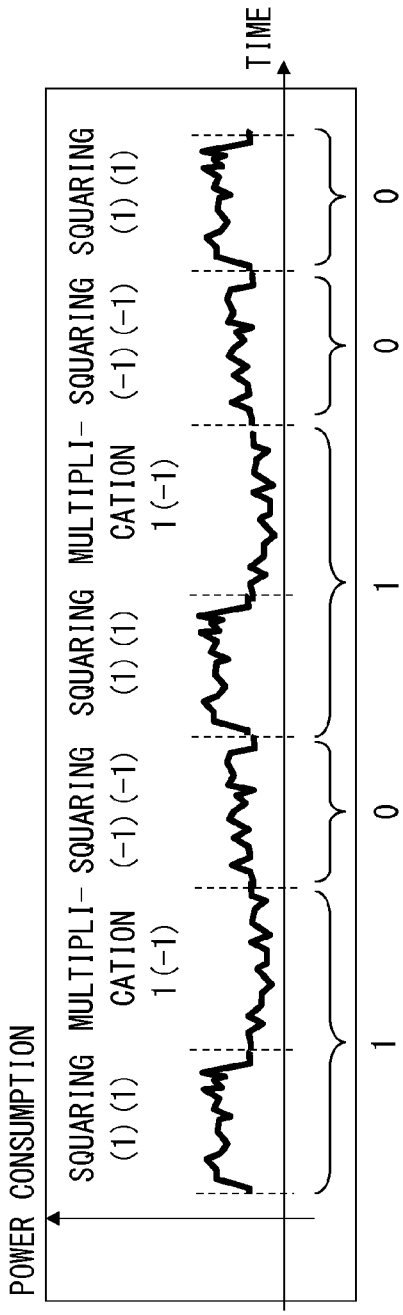
FIG. 5 is an example (attack method 1 as a related art) of a power consumption waveform when a=−1(mod n) and d=$(10100)_2$.
Figure 6:
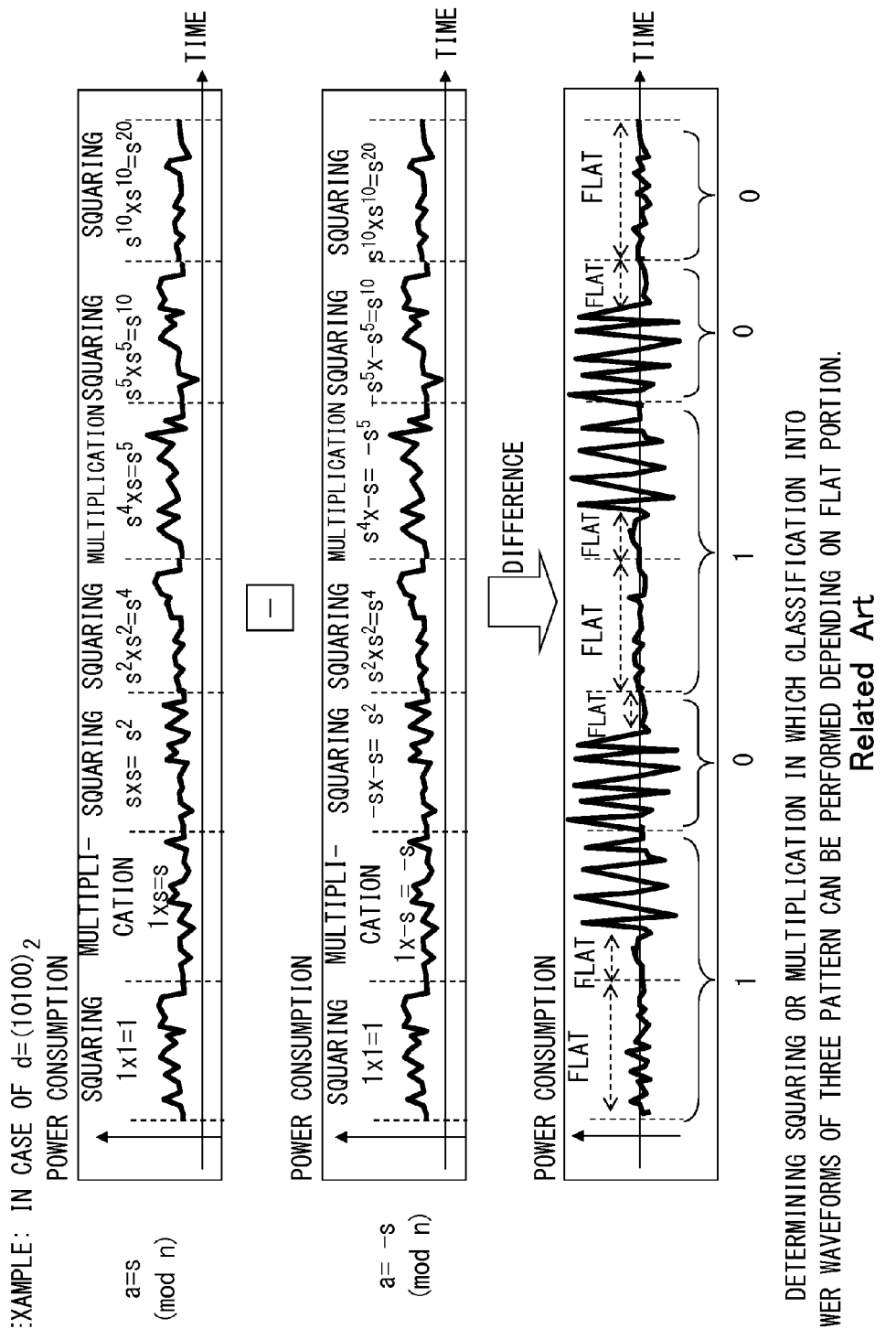
FIG. 6 is an example (attack method 2 as a related art) indicating the difference between the power consumption waveform of a=s(mod n) and the power consumption waveform of a=−s(mod n) with d=$(10100)_2$.

The effect can be clearly understood by comparing the power consumption waveform of the related art illustrated in FIGS. 5 and 6 with the power consumption waveform of the present invention illustrated in FIGS. 10 through 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encrypting method performed by an encrypting apparatus having a processor, the encrypting method having a countermeasure function against power analyzing attacks by performing an exponential remainder calculation $y=a^d$ (mod n) from an exponent d expressed by u-bit binary, input data a, and a modulo n to encrypt the input data a, the encrypting method comprising:
   calculating, using the processor, $a'=a^2 \pmod n$;
   calculating, using the processor, $y=(a)^f \pmod n$ on an exponent f that expresses higher order u−1 bits of d;
   calculating, using the processor, $y=y \times a \pmod n$ with $d_0=1$; and
   outputting the calculated y as encrypted data $y=a^d$ (mod n) of the input data a,
   wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

2. An encrypting method performed by an encrypting apparatus having a processor, the encrypting method having a countermeasure function against power analyzing attacks by performing an exponential remainder calculation $y=a^d$ (mod n) from an exponent d expressed by u-bit binary, input data a, and a modulo n using a binary method to encrypt the input data a, the encrypting method comprising:
   performing, using the processor, an initializing process with v=1;
   calculating, using the processor, $a'=a^2 \pmod n$;
   repeating, using the processor, in the order of i=u−1, u−2, . . . , 2, 1 a substep of calculating $v=v \times v \pmod n$, and a substep of calculating $v=v \times a' \pmod n$ with $d_i=1$;
   calculating, using the processor, $v=v \times a \pmod n$ with $d_0=1$; and
   outputting the calculated v as encrypted data $y=a^d$ (mod n) of the input data a,
   wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

3. An encrypting method performed by an encrypting apparatus having a processor, the encrypting method having a countermeasure function against power analyzing attacks for performing an exponential remainder calculation $y=a^d$ (mod n) from an exponent d expressed by a u-bit binary, input data a, and a modulo n using a binary method to encrypt the input data a, the encrypting method comprising:
   calculating, using the processor, $a'=a^2 \pmod n$;
   performing, using the processor, an initializing process with v=a';
   repeating, using the processor, a substep of calculating $v=v \times v \pmod n$ on i=u−2, u−2, . . . , 2, 1 and a substep of calculating $v=v \times a' \pmod n$ with $d_i=1$;
   calculating, using the processor, $v=v \times a \pmod n$ with g=1 for $g=d_0$; and
   outputting the calculated v as encrypted data $y=a^d$ (mod n) of the input data a,
   wherein when g is a least significant bit of d and f is higher order u−1 bits of d, by using f and g satisfying $d=2 \times f+g$, calculation of $a^d \pmod n = ((a^2)^f) \times a^g \pmod n$ is performed.

4. An encrypting method performed by an encrypting apparatus having a processor, the encrypting method having a countermeasure function against power analyzing attacks by performing an exponential remainder calculation $y=a^d$ (mod n) from an exponent d expressed by u-bit binary, input data a, and a modulo n using a window method to encrypt the input data a, the encrypting method comprising:
   generating, using the processor, a table w[x] satisfying $w[x]=(a^2)^x \pmod n$ for x=0, 1, . . . , $2^k-1$ with k as a bit width of window;
   performing, using the processor, an initializing process with v=1;
   repeating, using the processor, in the order of i=Ceiling((u−1)/k)−1, . . . , 2, 1, 0 a substep of repeating a squaring process on $v=v \times v \pmod n$ k times, a substep of calculating Ceiling((u−1)/k)−1 sequences $b_i$ expressed by $b_i$ from d, i, k, and a substep of calculating $v=v \times w[b_i] \pmod n$ using e×u as a calculation expressing a minimum value of a set of integer values equal to or exceeding x;
   calculating, using the processor, $v=v \times a \pmod n$ with $d_0=1$; and
   outputting the calculated v as encrypted data $y=a^d$ (mod n) of the input data a,
   wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

5. An encrypting method performed by an encrypting apparatus having a processor, the encrypting method having a countermeasure function against power analyzing attacks by performing an exponential remainder calculation $y=a^d$ (mod n) from an exponent expressed by u-bit binary, input data a, and a modulo n using a window method to encrypt the input data a, the encrypting method comprising:
   generating, using the processor, a table w[x] satisfying $w[x]=(a^2)^x \pmod n$ for x=0, 1, . . . , $2^k-1$ with k as a bit width of window;
   performing, using the processor, an initializing process of $v=w[b_i]$ for i=Ceiling((u−1)/k)−1 using e×u as a calculation expressing a minimum value of a set of integer values equal to or exceeding x;
   repeating, using the processor, in the order of i=Ceiling((u−1)/k)−2, . . . , 2, 1, 0 a substep of repeating the squaring process of $v=v \times v \pmod n$ k times, a substep of calculating Ceiling((u−1)/k)−1 sequences $b_i$ expressed by $b_i$ from d, i, k, and a substep of calculating $v=v \times w[b_i] \pmod n$;
   calculating, using the processor, $v=v \times a \pmod n$ with $d_0=1$; and
   outputting the calculated v as encrypted data $y=a^d$ (mod n) of the input data a,
   wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

6. An encryption apparatus having a countermeasure function against power analyzing attacks by performing an exponential remainder calculation $y=a^d$ (mod n) from an exponent d expressed by u-bit binary, input data a, and a modulo n to encrypt the input data a, the encryption apparatus comprising:

a memory; and a processor that performs a process including calculating $a'=a^2 \pmod n$;

calculating $y=(a')^f \pmod n$ on an exponent f that expresses higher order u−1 bits of d;

calculating $y=y \times a \pmod n$ with $d_0=1$; and outputting the calculated y as encrypted data $y=a^d \pmod n$ of the input data a, wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

7. A non-transitory computer readable recording medium having stored therein a program for causing a computer to execute an encryption process by performing an exponential remainder calculation $y=a^d \pmod n$ from an u-bit exponent d expressed by u-bit binary, input data a, and a modulo n to encrypt the input data a, the encryption process comprising:

calculating $a'=a^2 \pmod n$;

calculating $y=(a')^f \pmod n$ on an exponent $f=(d_{u-1}, d_{u-2}, \ldots, d_1)_2$ that expresses higher order u−1 bits of d;

calculating $y=y \times a \pmod n$ with $d_0=1$; and outputting the calculated y as encrypted data $y=a^d \pmod n$ of the input data a, wherein when g is a least significant bit of d and f is higher order u−1 bits of d, by using f and g satisfying $d=2 \times f+g$, a calculation of $a^d \pmod n = ((a^2)^f) \times a^g \pmod n$ is performed.

* * * * *